US009007408B2

(12) United States Patent
Jeon et al.

(10) Patent No.: US 9,007,408 B2
(45) Date of Patent: Apr. 14, 2015

(54) METHOD OF COMPENSATING A STAIN, A METHOD OF DRIVING A DISPLAY PANEL HAVING THE METHOD OF COMPENSATING A STAIN AND A DISPLAY APPARATUS FOR PERFORMING THE METHOD OF DRIVING THE DISPLAY PANEL

(75) Inventors: Jae-Gwan Jeon, Incheon (KR); Seok-Hwan Roh, Cheonan-si (KR); Takegama Akihiro, Hwaseong-si (KR); Jae-Hyoung Park, Suwon-si (KR); Min-Kyu Park, Hwaseong-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 207 days.

(21) Appl. No.: 13/585,112

(22) Filed: Aug. 14, 2012

(65) Prior Publication Data

US 2013/0201180 A1 Aug. 8, 2013

(30) Foreign Application Priority Data

Feb. 3, 2012 (KR) ........................ 10-2012-0011359

(51) Int. Cl.
*G09G 5/10* (2006.01)
*G06T 15/00* (2011.01)
*G09G 3/36* (2006.01)

(52) U.S. Cl.
CPC ...... *G09G 3/3648* (2013.01); *G09G 2320/0233* (2013.01); *G09G 2330/10* (2013.01); *G09G 2330/12* (2013.01); *G09G 2360/16* (2013.01)

(58) Field of Classification Search
CPC ... G09G 2330/10; G09G 3/36; G09G 3/3406; G09G 3/2092; G09G 2290/00; G09G 2300/00; G02F 1/133611; G02F 1/216; G06T 2207/30121
See application file for complete search history.

(56) References Cited

U.S. PATENT DOCUMENTS

| | | | | |
|---|---|---|---|---|
| 2006/0061593 A1* | 3/2006 | Miura et al. | | 345/612 |
| 2008/0001869 A1* | 1/2008 | Chung et al. | | 345/87 |
| 2010/0103198 A1* | 4/2010 | Polak et al. | | 345/690 |
| 2010/0123742 A1 | 5/2010 | Jang | | |
| 2012/0019529 A1* | 1/2012 | Kimpe | | 345/419 |
| 2013/0141409 A1* | 6/2013 | Kosei | | 345/207 |

FOREIGN PATENT DOCUMENTS

| | | |
|---|---|---|
| JP | 2005-221932 | 8/2005 |
| JP | 2008-224497 | 9/2008 |
| JP | 4685864 | 2/2011 |

* cited by examiner

*Primary Examiner* — Mark Zimmerman
*Assistant Examiner* — Nurun N Flora
(74) *Attorney, Agent, or Firm* — F. Chau & Associates, LLC

(57) ABSTRACT

A stain compensating method that includes detecting a luminance distribution of a display panel, dividing, using the luminance distribution, luminance profiles of stains overlapped with each other into individual luminance profiles for each of the stains, determining an area and a shape of the stain corresponding to one of the individual luminance profiles, generating a stain compensating value for the stain, and compensating input image data using the stain compensating value.

21 Claims, 6 Drawing Sheets

METHOD OF COMPENSATING A STAIN, A METHOD OF DRIVING A DISPLAY PANEL HAVING THE METHOD OF COMPENSATING A STAIN AND A DISPLAY APPARATUS FOR PERFORMING THE METHOD OF DRIVING THE DISPLAY PANEL

CROSS-REFERENCE TO RELATED APPLICATION

This application claims priority under 35 U.S.C. §119 to Korean Patent Application No. 10-2012-0011359, filed on Feb. 3, 2012, the disclosure of which is incorporated by reference herein in its entirety.

BACKGROUND

1. Technical Field

The present invention relates to a method of compensating a stain, a method of driving a display panel having the method of compensating a stain and a display apparatus for performing the method of driving a display panel. More particularly, the present invention relates to a method of compensating a stain for improving a display quality, a method of driving a display panel having the method of compensating a stain and a display apparatus for performing the method of driving a display panel.

2. Discussion of the Related Art

In general, a liquid crystal display ("LCD") panel includes a first substrate including a pixel electrode, a second substrate including a common electrode and a liquid crystal layer disposed between the first and second substrates. An electric field is generated by voltages applied to the pixel electrode and the common electrode. By adjusting an intensity of the electric field, the transmittance of light passing through the liquid crystal layer may be controlled so that an image may be displayed.

Due to an error in the manufacture of the first and second substrates, a stain, which is an abnormal luminance, may result. For example, the stain can be a relatively high luminance or a relatively low luminance compared to an area adjacent to the stain. The stain may be a horizontal line, a vertical line or a spot.

To compensate the stain, an algorithm to compensate input image data has been used. However, this stain compensating algorithm may not properly compensate stains that overlap with each other. Thus, a display quality of the LCD panel may be deteriorated.

SUMMARY

Exemplary embodiments of the present invention provide a method of compensating a stain to improve a display quality.

Exemplary embodiments of the present invention provide a method of driving a display panel having the method of compensating a stain.

Exemplary embodiments of the present invention provide a display apparatus for performing the method of driving a display panel.

In an exemplary embodiment of the present invention, a method of compensating a stain on a display panel is provided, the method includes detecting a luminance distribution of a display panel, dividing, using the luminance distribution, luminance profiles of stains overlapped with each other into individual luminance profiles for each of the stains, determining an area and a shape of the stain corresponding to one of the individual luminance profiles, generating a stain compensating value for the stain, and compensating input image data using the stain compensating value.

In an exemplary embodiment of the present invention, determining an area and a shape of the stain corresponding to one of the individual luminance profiles may include determining a central coordinate of the stain, wherein the central coordinate has a maximum luminance or a minimum luminance, and determining a boundary coordinate of the stain, wherein the boundary coordinate corresponds to a boundary between the stain and a normal luminance area.

In an exemplary embodiment of the present invention, the stain compensating value may be generated using the central coordinate of the stain and the boundary coordinate of the stain.

In an exemplary embodiment of the present invention, the stain compensating value may be generated by a linear interpolation method.

In an exemplary embodiment of the present invention, the stain compensating value may vary according to grayscales of the input image data corresponding to the stain.

In an exemplary embodiment of the present invention, when the display panel displays a three-dimensional ("3D") image, the generating a stain compensating value for the stain may include generating a first stain compensating value using a half of the central coordinate of the stain and a half of the boundary coordinate of the stain and generating a second stain compensating value to compensate another stain.

In an exemplary embodiment of the present invention, the second stain compensating value may be generated when the central coordinate of the stain or the boundary coordinate of the stain is an odd number.

In an exemplary embodiment of the present invention, when the display panel displays the 3D image, the input image data may include left image data having a resolution half of a resolution of the display panel and right image data having a resolution half of the resolution of the display panel.

In an exemplary embodiment of the present invention, a method of driving a display panel is provided, the method includes detecting a luminance distribution of a display panel, dividing, using the luminance distribution, luminance profiles of stains overlapped with each other into individual luminance profiles for each of the stains, determining an area and a shape of the stain corresponding to one of the individual luminance profiles, generating a stain compensating value for the stain, compensating input image data using the stain compensating value, generating a data voltage based on the compensated input image data, and outputting the data voltage to the display panel.

In an exemplary embodiment of the present invention, determining an area and a shape of the stain corresponding to one of the individual luminance profiles may include determining a central coordinate of the stain, wherein the central coordinate has a maximum luminance or a minimum luminance, and determining a boundary coordinate of the stain, wherein the boundary coordinate corresponds to a boundary between the stain and a normal luminance area.

In an exemplary embodiment of the present invention, the stain compensating value may be generated using the central coordinate of the stain and the boundary coordinate of the stain.

In an exemplary embodiment of the present invention, the stain compensating value may be generated by a linear interpolation method.

In an exemplary embodiment of the present invention, the stain compensating value may vary according to grayscales of the input image data corresponding to the stain.

In an exemplary embodiment of the present invention, when the display panel displays a 3D image, the generating a stain compensating value for the stain may include generating a first stain compensating value using a half of the central coordinate of the stain and a half of the boundary coordinate of the stain and generating a second stain compensating value to compensate another stain.

In an exemplary embodiment of the present invention, the second stain compensating value may be generated when the central coordinate of the stain or the boundary coordinate of the stain is an odd number.

In an exemplary embodiment of the present invention, when the display panel displays the 3D image, the input image data may include left image data having a resolution half of a resolution of the display panel and right image data having a resolution half of the resolution of the display panel.

In an exemplary embodiment of the present invention, a display apparatus is provided, the display apparatus includes a display panel, a timing controller and a data driver. The display panel is configured to display an image. The timing controller is configured to compensate input image data using a stain compensating value for a stain corresponding to a luminance profile that is overlapped by a luminance profile of another stain. The data driver is configured to generate a data voltage based on the compensated input image data, and is configured to output the data voltage to the display panel.

In an exemplary embodiment of the present invention, the stain compensating value may be generated using a central coordinate of the stain, wherein the central coordinate has a maximum luminance or a minimum luminance, and a boundary coordinate of the stain, wherein the boundary coordinate corresponds to a boundary between the stain and a normal luminance area.

In an exemplary embodiment of the present invention, the timing controller includes a 3D formatter configured to generate a 3D data signal based on the compensated input image data.

In an exemplary embodiment of the present invention, when the display panel displays a 3D image, the stain compensating value may include a first stain compensating value using a half of the central coordinate of the stain and a half of the boundary coordinate of the stain and a second stain compensating value to compensate another stain.

In an exemplary embodiment of the present invention, a method of compensating a stain on a display panel is provided, the method includes: detecting a luminance distribution of the display panel; distinguishing a first stain luminance profile from a second stain luminance profile using the luminance distribution, wherein the first and second stain luminance profiles overlap each other; generating a first stain compensating value based on a parameter of the first stain luminance profile and a second stain compensating value based on a parameter of the second stain luminance profile; and removing the stain from the display panel using the first and second stain compensating values.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF THE EMBODIMENTS

Hereinafter, exemplary embodiments of the present invention will be described in detail with reference to the accompanying drawings.

Figure 1:
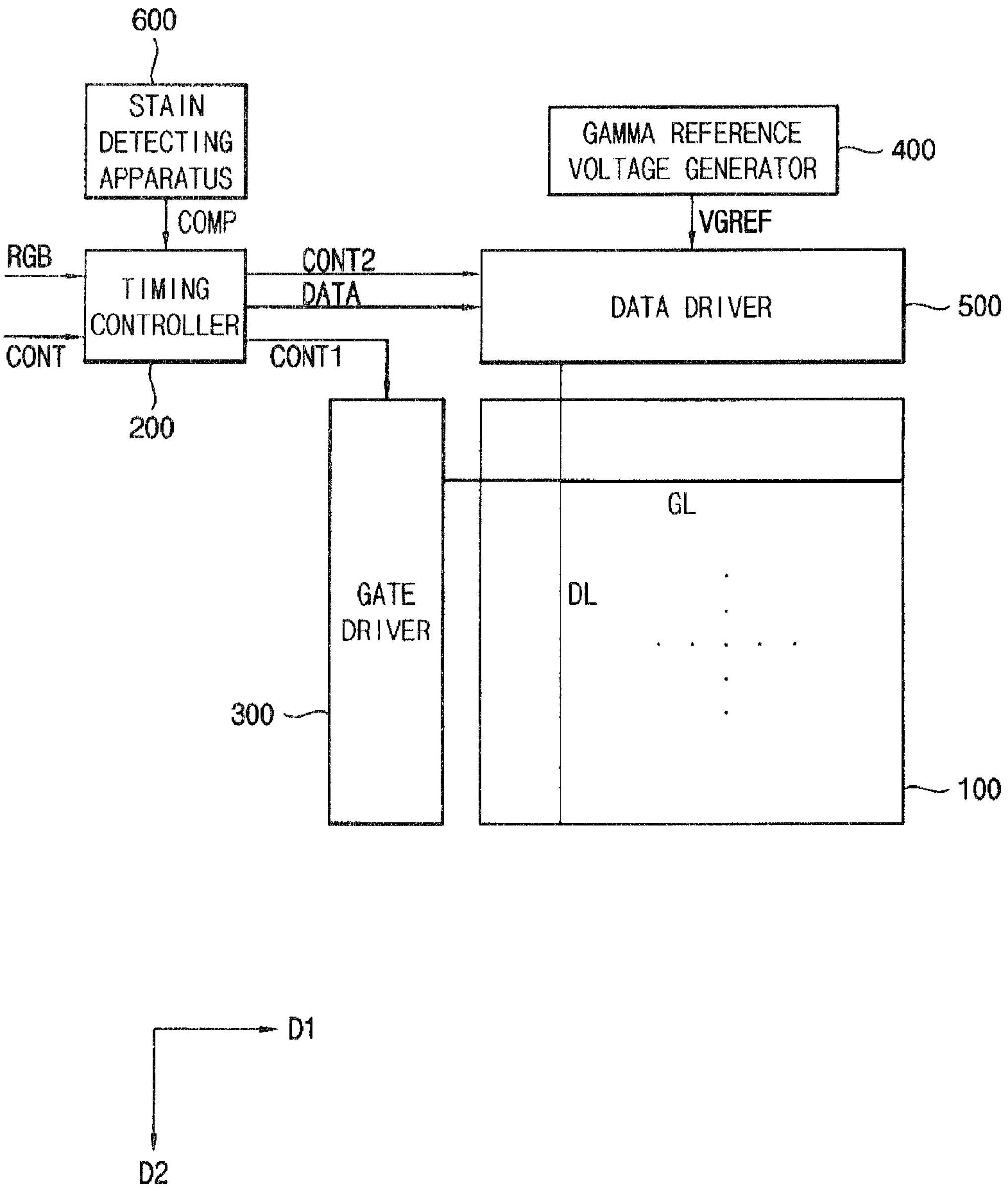
FIG. 1 is a block diagram illustrating a display apparatus and a stain detecting apparatus according to an exemplary embodiment of the present invention.

FIG. 1 is a block diagram illustrating a display apparatus and a stain detecting apparatus according to an exemplary embodiment of the present invention.

Referring to FIG. 1, the display apparatus includes a display panel 100, a timing controller 200, a gate driver 300, a gamma reference voltage generator 400 and a data driver 500. The stain detecting apparatus 600 detects a stain on the display panel 100. Herein, the stain may be an area of abnormal luminance which has a relatively high luminance or a relatively low luminance compared to an adjacent area.

The display panel 100 includes a plurality of gate lines GL, a plurality of data lines DL and a plurality of pixels connected to the gate lines GL and the data lines DL.

The gate lines GL extend in a first direction D1, and the data lines DL extend in a second direction D2 crossing the first direction D1. The pixels may each include a switching element, a liquid crystal capacitor and a storage capacitor. The liquid crystal capacitor and the storage capacitor are electrically connected to the switching element. The pixels are arranged in a matrix form. The switching element may be a thin film transistor ("TFT").

The liquid crystal capacitor includes a first electrode connected to a pixel electrode and a second electrode connected to a common electrode. A data voltage is applied to the first electrode of the liquid crystal capacitor. A common voltage is applied to the second electrode of the liquid crystal capacitor. The storage capacitor includes a first electrode connected to the pixel electrode and a second electrode connected to a storage electrode. The data voltage is applied to the first electrode of the storage capacitor. A storage voltage is applied to the second electrode of the storage capacitor. The storage voltage may be substantially equal to the common voltage.

The timing controller 200 receives input grayscale data RGB and an input control signal CONT from an external apparatus. The input grayscale data RGB may include red grayscale data R, green grayscale data G and blue grayscale data B. The input control signal CONT may include a master clock signal, a data enable signal, a vertical synchronizing signal and a horizontal synchronizing signal.

The timing controller 200 receives a stain compensating value COMP from the stain detecting part 600.

The timing controller 200 generates a first control signal CONT1, a second control signal CONT2 and a data signal DATA based on the input grayscale data RGB, the stain compensating value COMP and the input control signal CONT.

The timing controller 200 generates the first control signal CONT1 to control a drive timing of the gate driver 300 based on the input control signal CONT, and outputs the first control signal CONT1 to the gate driver 300. The first control signal CONT1 may include a vertical start signal and a gate clock signal.

The timing controller 200 generates the second control signal CONT2 to control a drive timing of the data driver 500 based on the input control signal CONT, and outputs the second control signal CONT2 to the data driver 500. The second control signal CONT2 may include a horizontal start signal and a load signal.

The timing controller 200 generates the data signal DATA based on the input grayscale data RGB and the stain compensating value COMP, and outputs the data signal DATA to the data driver 500.

Figure 3:
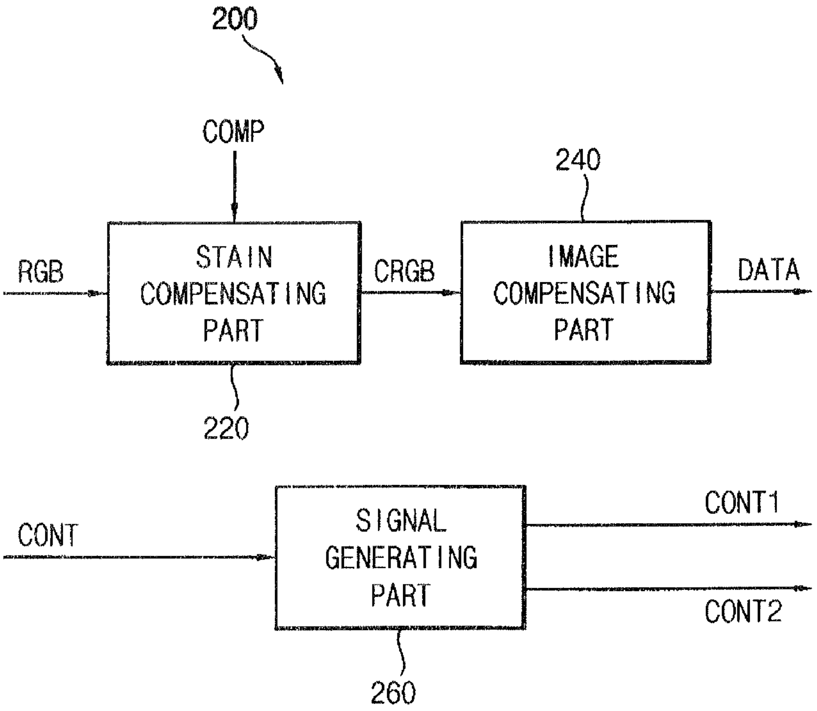
FIG. 3 is a block diagram illustrating a timing controller of FIG. 1, according to an exemplary embodiment of the present invention.

An operation and a structure of the timing controller 200 are explained in detail referring to FIG. 3.

The gate driver 300 receives the first control signal CONT1 from the timing controller 200. The gate driver 300 generates gate signals for driving the gate lines GL in response to the first control signal CONT1. The gate driver 300 sequentially outputs the gate signals to the gate lines GL.

The gate driver 300 may be disposed, e.g., directly mounted, on the display panel 100, or may be connected to the display panel 100 in a tape carrier package ("TCP") type. Alternatively, the gate driver 300 may be integrated on the display panel 100.

The gamma reference voltage generator 400 generates a gamma reference voltage VGREF. The gamma reference voltage generator 400 provides the gamma reference voltage VGREF to the data driver 500. The gamma reference voltages VGREF have values corresponding to the data signal DATA.

For example, the gamma reference voltage generator 400 includes a resistor string circuit having a plurality of resistors connected in series and dividing a source voltage and a ground voltage to generate the gamma reference voltage VGREF. The gamma reference voltage generator 400 outputs the gamma reference voltage VGREF to the data driver 500. The gamma reference voltage generator 400 may be disposed in the data driver 500.

The data driver 500 receives the second control signal CONT2 and the data signal DATA from the timing controller 200. The data driver 500 receives the gamma reference voltage VGREF from the gamma reference voltage generator 400.

The data driver 500 converts the data signal DATA into data voltages of the analog type using the gamma reference voltage VGREF. The data driver 500 sequentially outputs the data voltages to the data lines DL.

The data driver 500 may include a shift register (not shown), a latch (not shown), a signal processor (not shown) and a buffer (not shown). The shift register outputs a latch pulse to the latch. The latch temporarily stores the data signal DATA, and outputs the data signal DATA to the signal processor. The signal processor generates the data voltages of the analog type based on the data signal DATA of the digital type and the gamma reference voltages VGREF, and outputs the data voltages to the buffer. The buffer compensates the data voltages to have a uniform level, and outputs the data voltages to the data lines DL.

The data driver 500 may be disposed, e.g., directly mounted, on the display panel 100, or may be connected to the display panel 100 in a TCP type. Alternatively, the data driver 500 may be integrated on the display panel 100.

Figure 2:
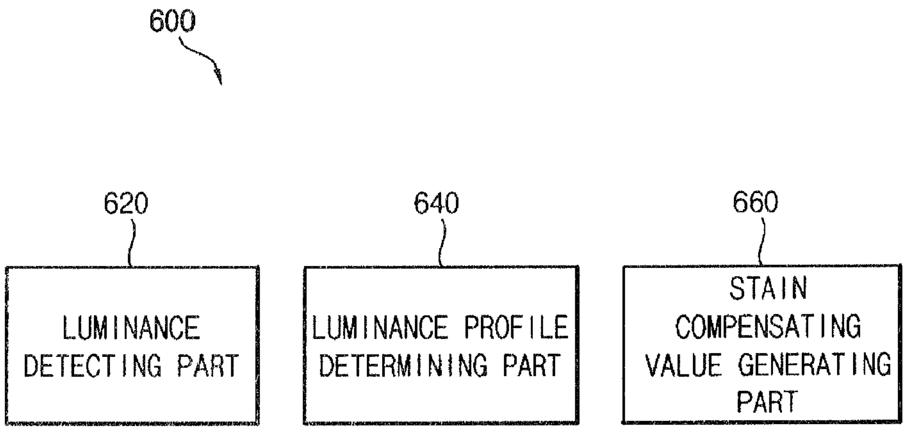
FIG. 2 is a block diagram illustrating the stain detecting apparatus of FIG. 1, according to an exemplary embodiment of the present invention.

FIG. 2 is a block diagram illustrating the stain detecting apparatus 600 of FIG. 1, according to an exemplary embodiment of the present invention.

Referring to FIGS. 1 and 2, the stain detecting apparatus 600 includes a luminance detecting part 620, a luminance profile determining part 640 and a stain compensating value generating part 660. The stain detecting apparatus 600 is logically divided into the above elements. The stain detecting apparatus 600 may not be physically divided into the above elements.

The luminance detecting part 620 detects a luminance distribution of the display panel 100. The luminance detecting part 620 may detect the luminance distribution of the display panel 100 when the input image data RGB is provided to the display panel 100. For example, the luminance detecting part 620 may include a camera.

The luminance profile determining part 640 analyzes the luminance distribution of the display panel 100 to determine the number of luminance profiles of stains which are overlapped with each other. When the display panel 100 has a plurality of overlapping luminance profiles, the luminance profile determining part 640 divides the luminance profiles of the stains overlapped with each other into independent luminance profiles of the respective stains. Herein, the independent luminance profile of a stain may have linearity.

The luminance profile determining part 640 determines an area and a shape of each of the stains corresponding to the divided luminance profiles. For example, a shape of a stain may be a horizontal line, a vertical line or a spot.

The luminance profile determining part 640 determines a central coordinate and boundary coordinates of each stain. The central coordinate of the stain may correspond to a position having a maximum luminance or a minimum luminance. The boundary coordinates of the stain may correspond to boundaries between the stain and a normal luminance area.

For example, when the stain includes luminances higher than the normal luminance area, the central coordinate of the stain is a coordinate of a position having a maximum luminance. The boundary coordinates of the stain are coordinates of starting positions having luminances higher than the normal luminance area.

For example, when the stain includes luminances lower than the normal luminance area, the central coordinate of the stain is a coordinate of a position having a minimum luminance. The boundary coordinates of the stain are coordinates of starting positions having luminances lower than the normal luminance area.

A width of the stain is a distance between a first boundary coordinate disposed at a first side with respect to the central coordinate and a second boundary coordinate disposed at a second side with respect to the central coordinate opposite the first side.

The stain compensating value generating part 660 generates the stain compensating value COMP to compensate the stain on the display panel 100. The stain compensating value COMP is provided to the timing controller 200. For example, the stain compensating value generating part 660 may have a lookup table.

The stain compensating value COMP may be a grayscale value added to a grayscale value of the image data RUB input to the display apparatus. For example, the stain compensating value COMP may include a red stain compensating value, a green stain compensating value and a blue stain compensating value.

For example, when the stain includes luminances higher than the normal luminance area, the stain compensating value COMP may have a negative (−) value to decrease the luminance of the stain.

For example, when the stain includes luminances lower than the normal luminance area, the stain compensating value COMP may have a positive (+) value to increase the luminance of the stain.

The stain compensating value generating part 660 calculates the stain compensating value COMP using the central coordinate and the boundary coordinates of the stain. The stain compensating value generating part 660 may include a coordinate interpolating part (not shown) for generating the stain compensating value COMP between the central coordinate and the boundary coordinates of the stain by a linear interpolation method. The stain compensating value generating part 660 may include a red coordinate interpolating part, a green coordinate interpolating part and a blue coordinate interpolating part.

The stain compensating value generating part 660 may generate the stain compensating value COMP which varies according to grayscales of the input image data RGB corresponding to the stain. For example, when the grayscales of the input image data RUB corresponding to the stain decrease, the stain compensating value COMP may increase.

The stain compensating value generating part 660 may include a grayscale interpolating part (not shown) for generating the stain compensating value COMP according to the grayscales of the input image data RGB by a linear interpolation method. The stain compensating value generating part 660 may include a red grayscale interpolating part, a green grayscale interpolating part and a blue grayscale interpolating part.

FIG. 3 is a block diagram illustrating the timing controller 200 of FIG. 1, according to an exemplary embodiment of the present invention.

Referring to FIGS. 1 to 3, the timing controller 200 includes a stain compensating part 220, an image compensating part 240 and a signal generating part 260. The timing controller 200 is logically divided into the above elements. The timing controller 200 may not be physically divided into the above elements.

The stain compensating part 220 receives the input image data RGB and the stain compensating value COMP. The stain compensating part 220 generates compensated image data CRGB based on the input image data RGB and the stain compensating value COMP. For example, the stain compensating part 220 compensates the stain on the display panel 100 by adding the stain compensating value COMP to the input image data RGB.

The stain compensating part 220 outputs the compensated image data CRGB to the image compensating part 240.

The image compensating part 240 receives the compensated image data CRGB from the stain compensating part 220.

The image compensating part 240 compensates a grayscale of the compensated image data CRGB. The image compensating part 240 may include an adaptive color correcting part (not shown) and a dynamic capacitance compensating part (not shown).

The adaptive color correcting part receives the grayscale data, and performs an adaptive color correction ("ACC"). The adaptive color correcting part may compensate the grayscale data using a gamma curve.

The dynamic capacitance compensating part performs a dynamic capacitance compensation ("DCC"), which may compensate the grayscale data of present frame data using previous frame data and the present flame data.

The image compensating part 240 compensates the grayscale of the compensated image data CRGB and rearranges the compensated image data CRGB to generate the data signal DATA to correspond to a data type of the data driver 500. The data signal DATA may be a digital type. The image compensating part 240 outputs the data signal DATA to the data driver 500.

Unlike that shown in FIG. 3, the image compensating part 240 may be disposed prior to the stain compensating part 220.

The signal generating part 260 receives the input control signal CONT. The signal generating part 260 generates the first control signal CONT1 to control a drive timing of the gate driver 300 based on the input control signal CONT. The signal generating part 260 generates the second control signal CONT2 to control a drive timing of the data driver 500 based on the input control signal CONT.

The signal generating part 260 outputs the first control signal CONT1 to the gate driver 300. The signal generating part 260 outputs the second control signal CONT2 to the data driver 500.

Figure 4:
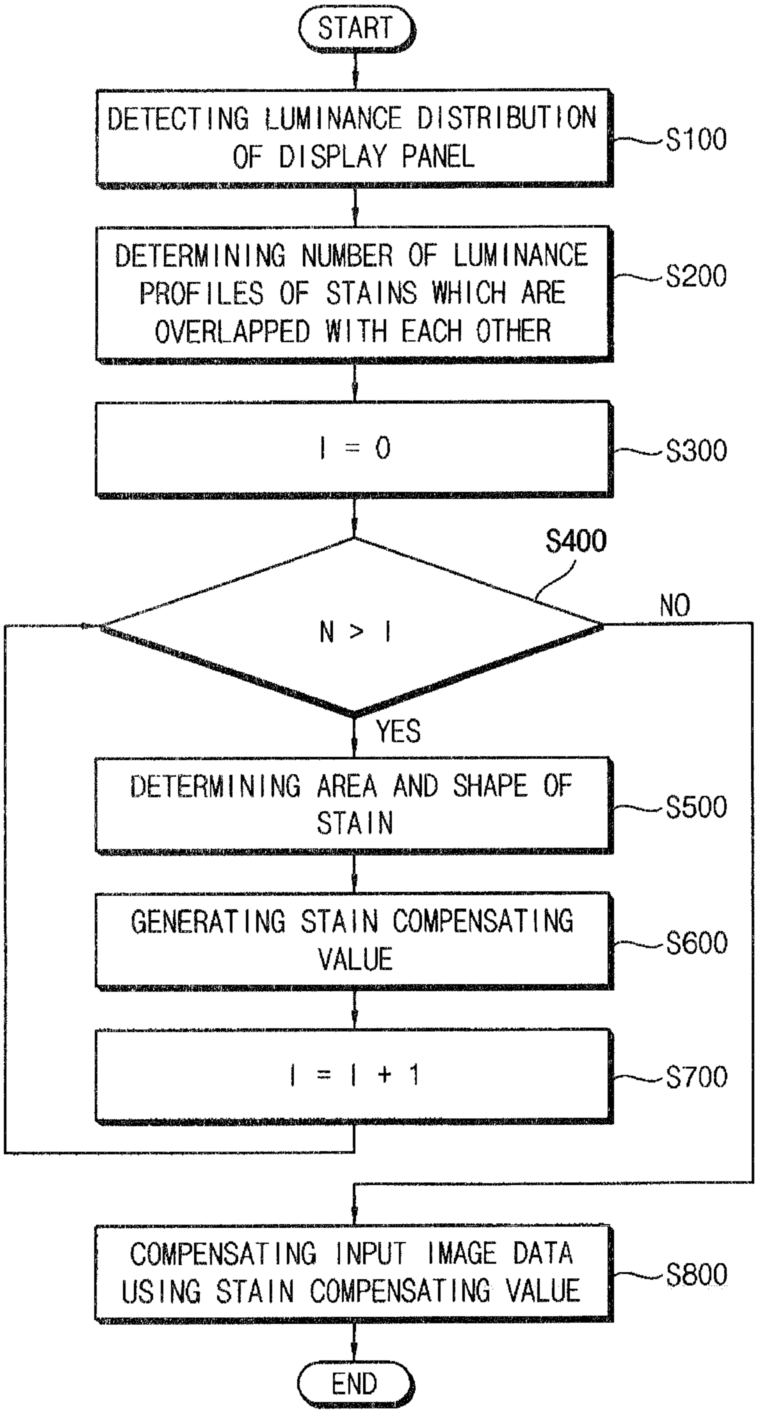
FIG. 4 is a flowchart illustrating a method of compensating a stain on the display panel of FIG. 1, according to an exemplary embodiment of the present invention.

FIG. 4 is a flowchart illustrating a method of compensating a stain on the display panel 100 of FIG. 1, according to an exemplary embodiment of the present invention.

Referring to FIGS. 1 to 4, the luminance detecting part 620 detects the luminance distribution of the display panel 100 (step S100).

The luminance profile determining part 640 analyzes the luminance distribution to determine the number N of luminance profiles of stains which are overlapped with each other (step S200).

A reference value I is set to a predetermined value to adjust the number of stains to be compensated according to the number N of the luminance profiles of the stains (step S300). The reference value I is set to zero.

The luminance profile determining part 640 compares the number N of the luminance profiles of the stains to the reference value I, which is zero (step S400).

When the number N of the luminance profiles of the stains is greater than the reference value I, which is zero, the luminance profile determining part 640 determines that a stain is present on the display panel 100. When the number N of the luminance profiles of the stains is greater than the reference value I, which is zero, processes for generating a stain compensating value (steps S500 and S600) are performed.

When the number N of the luminance profiles of the stains is not greater than the reference value I, which is zero, the luminance profile determining part 640 determines that a stain is not present on the display panel 100. When the number N of the luminance profiles of the stains is not greater than the reference value I, which is zero, the processes for generating a stain compensating value (steps S500 and S600) are not performed.

When the number N of the luminance profiles of the stains is greater than the reference value I, which is zero, the luminance profile determining part 640 determines an area and a shape of the stain corresponding to a particular luminance profile (step S500). The luminance profile determining part 640 determines a central coordinate of the stain and boundary coordinates of the stain.

The stain compensating value generating part 660 generates the stain compensating value COMP to compensate the stain on the display panel 100 (step S600). The stain compensating value generating part 660 may perform the coordinate interpolation and the grayscale interpolation.

The reference value I increases by one (step S700) when an additional stain luminance profile exists.

The luminance profile determining part 640 compares the number N of the luminance profiles of the stains to the reference value I again (step S400). When the number N of the luminance profiles of the stains is not greater than the reference value I, the processes of generating a stain compensating value (steps S500 and S600) are no longer performed. The input image data RGB is compensated using the stain compensating value COMP (step S800).

In summary, when the luminance profile of a stain does not exist, the processes of generating a stain compensating value (steps S500 and S600) are not performed. When there is just one luminance profile of a stain, the processes of generating a stain compensating value (steps S500 and S600) are performed once. When the number N of the luminance profiles of the stains is K (e.g., more than one), the processes of generating a stain compensating value (steps S500 and S600) are performed K times. Herein, K is a positive integer.

Figure 5:
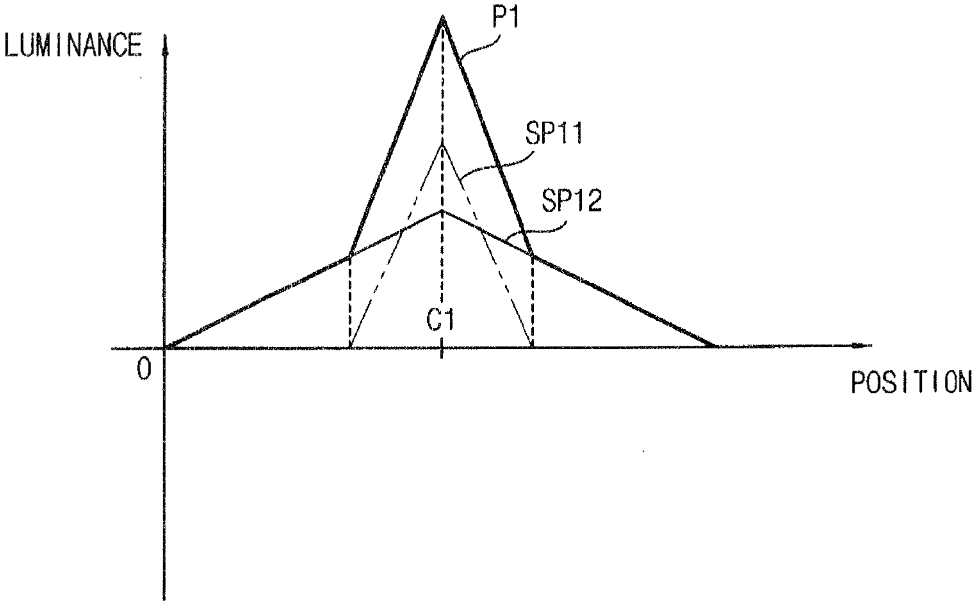
FIG. 5 is a graph illustrating a luminance profile of a first discontinuous stain, which may be generated on the display panel of FIG. 1, according to an exemplary embodiment of the present invention.

FIG. 5 is a graph illustrating a luminance profile of a first discontinuous stain, which may be generated on the display panel 100 of FIG. 1, according to an exemplary embodiment of the present invention.

Referring to FIGS. 1 to 3 and 5, the luminance profile P1 of the first discontinuous stain includes a first sub luminance profile SP11 and a second sub luminance profile SP12.

A stain of the first sub luminance profile SP11 has luminances higher than the normal luminance area. A stain of the second sub luminance profile SP12 has luminances higher than the normal luminance area.

A central coordinate C1 of the stain of the first sub luminance profile SP11 is substantially the same as a central coordinate C1 of the stain of the second sub luminance profile SP12.

A width of the stain of the first sub luminance profile SP11 is less than a width of the stain of the second sub luminance profile SP12.

A central coordinate C1 of the luminance profile P1 of the first discontinuous stain is substantially the same as the central coordinates C1 of the stains of the first and second sub luminance profiles SP11 and SP12. The luminance profile P1 of the first discontinuous stain has a low inclination at an outer area corresponding to the second sub luminance profile SP12 and a high inclination at a central area corresponding to the first sub luminance profile SP11.

The luminance profile determining part 640 divides the luminance profile P1 of the first discontinuous stain into the first sub luminance profile SP11 and the second sub luminance profile SP12. The stain compensating value generating part 660 generates a stain compensating value corresponding to the first sub luminance profile SP11 and a stain compensating value corresponding to the second sub luminance profile SP 12. The stain compensating part 220 compensates the input image data RGB based on the stain compensating values. Thus, the stain displayed on the display panel 100 may be removed.

For example, the stain of the second sub luminance profile SP12 which has a relatively greater width than the stain of the first sub luminance profile SP11 may be removed first. Then, the stain of the first sub luminance profile SP11 may be removed.

Figure 6:
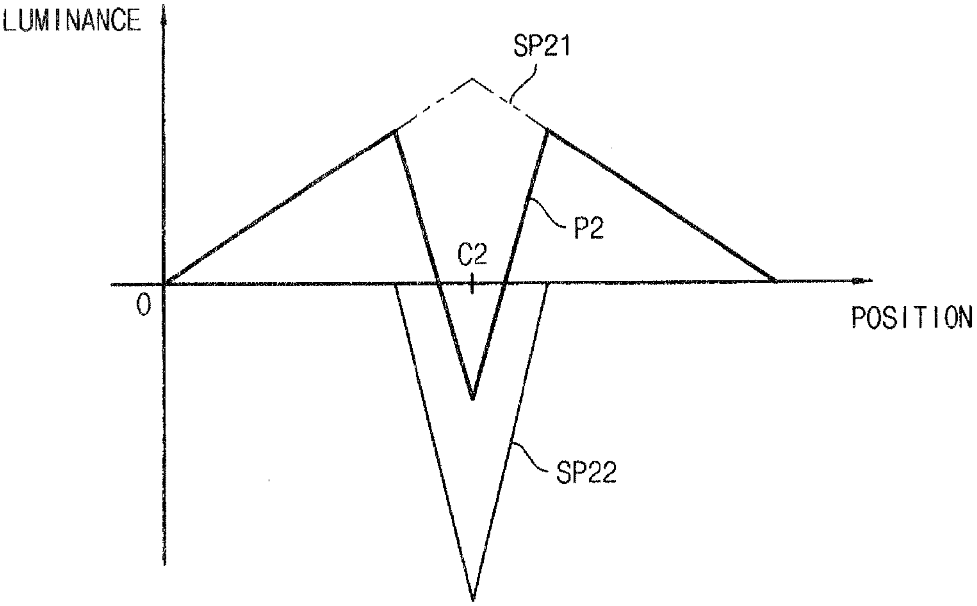
FIG. 6 is a graph illustrating a luminance profile of a second discontinuous stain, which may be generated on the display panel of FIG. 1, according to an exemplary embodiment of the present invention.

FIG. 6 is a graph illustrating a luminance profile of a second discontinuous stain, which may be generated on the display panel 100 of FIG. 1, according to an exemplary embodiment of the present invention.

Referring to FIGS. 1 to 3 and 6, the luminance profile P2 of the second discontinuous stain includes a third sub luminance profile SP21 and a fourth sub luminance profile SP22.

A stain of the third sub luminance profile SP21 has luminances higher than the normal luminance area. A stain of the fourth sub luminance profile SP22 has luminances lower than the normal luminance area.

A central coordinate C2 of the stain of the third sub luminance profile SP21 is substantially the same as a central coordinate C2 of the stain of the fourth sub luminance profile SP22.

A width of the stain of the third sub luminance profile SP21 is greater than a width of the stain of the fourth sub luminance profile SP22.

A central coordinate C2 of the luminance profile P2 of the second discontinuous stain is substantially the same as the central coordinates C2 of the third and fourth sub luminance profiles SP21 and SP22. The luminance profile P2 of the second discontinuous stain has a positive inclination at an outer area corresponding to the third sub luminance profile SP21 and a negative inclination at a central area corresponding to the fourth sub luminance profile SP22.

The luminance profile determining part 640 divides the luminance profile P2 of the second discontinuous stain into the third sub luminance profile SP21 and the fourth sub luminance profile SP22. The stain compensating value generating part 660 generates a stain compensating value corresponding to the third sub luminance profile SP21 and a stain compensating value corresponding to the fourth sub luminance profile SP22. The stain compensating part 220 compensates the input image data RGB based on the stain compensating values. Thus, the stain displayed on the display panel 100 may be removed.

For example, the stain of the third sub luminance profile SP21 which has a relatively greater width that the stain of the fourth sub luminance profile SP22 may be removed first. Then, the stain of the fourth sub luminance profile SP22 may be removed.

Figure 7:
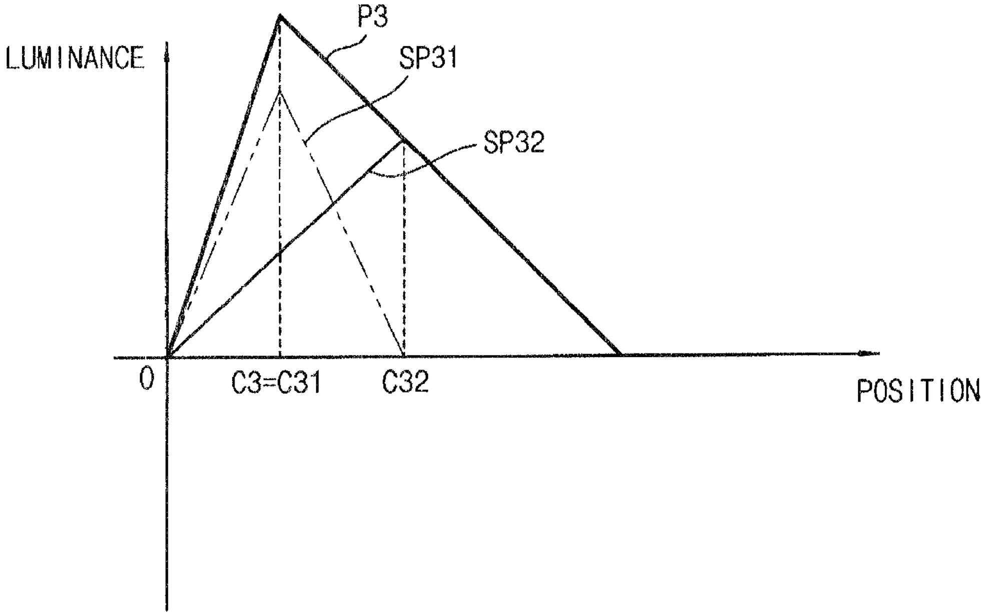
FIG. 7 is a graph illustrating a luminance profile of an asymmetrical stain, which may be generated on the display panel of FIG. 1, according to an exemplary embodiment of the present invention.

FIG. 7 is a graph illustrating a luminance profile of an asymmetrical stain, which may be generated on the display panel 100 of FIG. 1, according to an exemplary embodiment of the present invention.

Referring to FIGS. 1 to 3 and 7, the luminance profile P3 of the asymmetrical stain includes a fifth sub luminance profile SP31 and a sixth sub luminance profile SP32.

A stain of the fifth sub luminance profile SP31 has luminances higher than the normal luminance area. A stain of the sixth sub luminance profile SP32 has luminances higher than the normal luminance area.

A central coordinate C31 of the stain of the fifth sub luminance profile SP31 is different from a central coordinate C32 of the stain of the sixth sub luminance profile SP32.

A width of the stain of the fifth sub luminance profile SP31 is less than a width of the stain of the sixth sub luminance profile SP32.

A central coordinate C3 of the luminance profile P3 of the asymmetrical stain is substantially the same as the central coordinate C31 of the fifth sub luminance profile SP31. The luminance profile P3 of the asymmetrical stain has a high inclination and a narrow width at a left side. The luminance profile P3 of the asymmetrical stain has a low inclination and a wide width at a right side.

The luminance profile determining part 640 divides the luminance profile P3 of the asymmetrical stain into the fifth sub luminance profile SP31 and the sixth sub luminance profile SP32. The stain compensating value generating part 660 generates a stain compensating value corresponding to the fifth sub luminance profile SP31 and a stain compensating value corresponding to the sixth sub luminance profile SP32. The stain compensating part 220 compensates the input image data. RGB based on the stain compensating values. Thus, the stain displayed on the display panel 100 may be removed.

Figure 8:
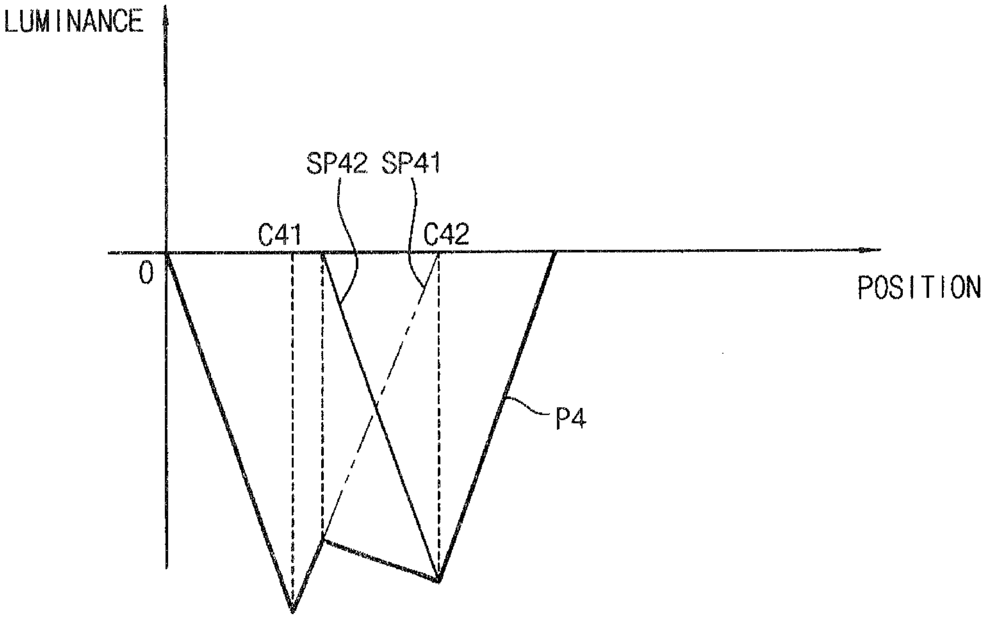
FIG. 8 is a graph illustrating a luminance profile of a double-peak stain, which may be generated on the display panel of FIG. 1, according to an exemplary embodiment of the present invention.

FIG. 8 is a graph illustrating a luminance profile of a double-peak stain, which may be generated on the display panel 100 of FIG. 1, according to an exemplary embodiment of the present invention.

Referring to FIGS. 1 to 3 and 8, the luminance profile P4 of the double-peak stain includes a seventh sub luminance profile SP41 and an eighth sub luminance profile SP42.

A stain of the seventh sub luminance profile SP41 has luminances lower than the normal luminance area. A stain of the eighth sub luminance profile SP42 has luminances lower than the normal luminance area.

A central coordinate C41 of the stain of the seventh sub luminance profile SP41 is different from a central coordinate C42 of the stain of the eighth sub luminance profile SP42.

A width of the stain of the seventh sub luminance profile SP41 is greater than a width of the stain of the eighth sub luminance profile SP42.

The luminance profile P4 of the double-peak stain has a first peak corresponding to the central coordinate C41 of the seventh sub luminance profile SP41 and a second peak corresponding to the central coordinate C42 of the eighth sub luminance profile SP42. The luminance profile P4 of the double-peak stain has a luminance curve that sequentially decreases, increases, decreases and increases.

The luminance profile determining part 640 divides the luminance profile P4 of the double-peak stain into the seventh sub luminance profile SP41 and the eighth sub luminance profile SP42. The stain compensating value generating part 660 generates a stain compensating value corresponding to the seventh sub luminance profile SP41 and a stain compensating value corresponding to the eighth sub luminance profile SP42. The stain compensating part 220 compensates the input image data RGB based on the stain compensating values. Thus, the stain displayed on the display panel 100 may be removed.

According to the present exemplary embodiment, the luminance profiles of the stains overlapped with each other are divided into independent luminance profiles of the respective stains. The stain compensating value for each stain's luminance profile is determined so that the stain on the display panel 100 may be effectively removed. Thus, the display quality of the display panel 100 may be improved.

Figure 9:
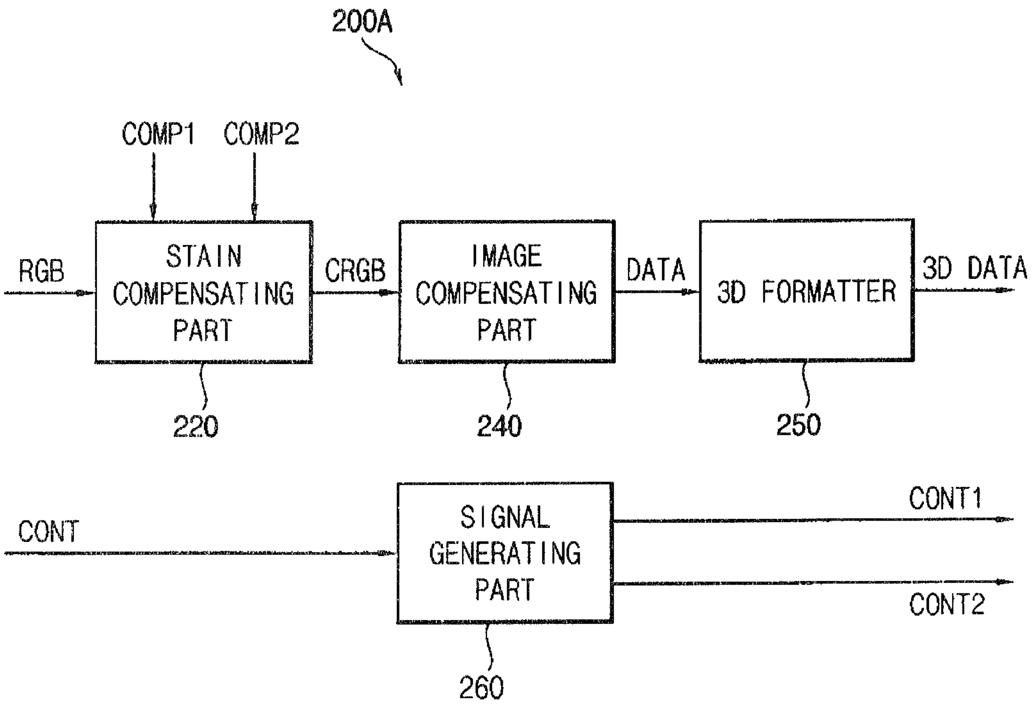
FIG. 9 is a block diagram illustrating a timing controller of a display apparatus according to an exemplary embodiment of the present invention.

FIG. 9 is a block diagram illustrating a timing controller of a display apparatus according to an exemplary embodiment of the present invention.

A display apparatus, a method of compensating a stain and a method of driving a display panel according to the present exemplary embodiment are substantially the same as the display apparatus, the method of compensating a stain and the method of driving a display panel of the previous exemplary embodiment explained referring to FIGS. 1 to 8 except that the display panel displays a three-dimensional ("3D") image, the timing controller further includes a 3D formatter and the method of compensating a stain further includes a step of compensating a stain for 3D image. Thus, the same reference numerals will be used to refer to the same or like parts as those described in the previous exemplary embodiment of FIGS. 1 to 8 and any repetitive explanation concerning the above elements will be omitted.

Referring to FIGS. 1, 2 and 9, the display apparatus includes a display panel 100, a timing controller 200A, a gate driver 300, a gamma reference voltage generator 400 and a data driver 500. The stain detecting apparatus 600 detects a stain on the display panel 100.

The display panel 100 displays a 3D image. The display panel 100 may be driven by a temporal division method or a spatial division method to display the 3D image.

The timing controller 200A receives input grayscale data RGB and an input control signal CONT from an external apparatus. The input grayscale data RGB may include left image data having a resolution half of a resolution of the display panel 100 and right image data having a resolution half of the resolution of the display panel 100. When the resolution of the display panel 100 is a Full high-definition (HD) resolution, each of the resolutions of the left image data and the right image data may be a Half Full HD resolution.

The timing controller 200A includes a stain compensating part 220, an image compensating part 240, a 3D formatter 250 and a signal generating part 260. The timing controller 200A is logically divided into the above elements. The timing controller 200A may not be physically divided into the above elements.

The stain compensating part 220 receives the input image data RGB, a first stain compensating value COMP1 and a second stain compensating value COMP2. The stain compensating part 220 generates compensated image data CRGB based on the input image data RGB and the first and second stain compensating values COMP1 and COMP2. The stain compensating part 220 outputs the compensated image data CRGB to the image compensating part 240.

The image compensating part 240 receives the compensated image data CRGB from the stain compensating part 220. The image compensating part 240 compensates a grayscale of the compensated image data CRGB. The image compensating part 240 may include an adaptive color correcting part (not shown) and a dynamic capacitance compensating part (not shown). The image compensating part 240 compensates the grayscale of the compensated image data CRGB and rearranges the compensated image data CRGB to generate the data signal DATA to correspond to a data type of the data driver 500.

The 3D formatter 250 copies the data signal DATA to generate a 3D data signal 3D DATA. For example, the 3D formatter 250 converts two images each of which has a Half Full HD resolution of 60 Hz into four images each of which has a Full HD resolution of 240 Hz.

The 3D data signal 3D DATA may be a digital type. The 3D formatter 250 outputs the 3D data signal 3D DATA to the data driver 500.

The signal generating part 260 receives the input control signal CONT. The signal generating part 260 generates the first control signal CONT1 to control a drive timing of the gate driver 300 based on the input control signal CONT. The signal generating part 260 generates the second control signal CONT2 to control a drive timing of the data driver 500 based on the input control signal CONT.

The signal generating part 260 outputs the first control signal CONT1 to the gate driver 300. The signal generating part 260 outputs the second control signal CONT2 to the data driver 500.

The stain detecting apparatus 600 detects a luminance distribution of the display panel 100, analyzes the luminance distribution, divides luminance profiles of stains overlapped with each other into independent luminance profiles for the respective stains, determines an area and a shape of each of the stains using each stain's luminance profile, and generates the first stain compensating value COMP1 to compensate the stain on the display panel 100.

The stain detecting apparatus 600 generates the first stain compensating value COMP1 using a central coordinate and boundary coordinates of the stain. The stain detecting apparatus 600 generates the first stain compensating value COMP 1 using a half of the central coordinate and halves of the boundary coordinates of the stain.

For example, when the central coordinate of the stain is 10, the stain detecting apparatus 600 generates a compensating value for compensating grayscale data corresponding to a coordinate of 5 in the left image data and a compensating value for compensating grayscale data corresponding to a coordinate of 5 in the right image data.

For example, when the width of the stain is 6, the stain detecting apparatus 600 generates a compensating value for compensating grayscale data corresponding to a width of 3 in the left image data and a compensating value for compensating grayscale data corresponding to a width of 3 in the right image data.

When the left image data and the right image data are converted to have the resolution of the display panel 100, the left image data and the right image data are converted to double their size so that the first stain compensating value COMP1 is generated using a half of the central coordinate and halves of the boundary coordinates of the stain.

However, when the input image data RGB are compensated using the first stain compensating value COMP1, the stain may not be completely removed by the process of converting the left image data and the right image data to double their size by the 3D formatter 250.

For example, when the central coordinate of the stain is 9, a half of the central coordinate of the stain is not an integer so that the first compensating value COMP1 is not precisely determined. When the half of the central coordinate of the stain is regarded as 4 or 5, the central coordinate of the stain on the display panel 100 and the central coordinate of the stain in the 3D image do not match so that the stain may not be completely removed.

For example, when the width of the stain is 5, a half of the width of the stain is not an integer so that the first compensating value COMP1 is not precisely determined. When the half of the width of the stain is regarded as 2 or 3, the boundaries of the stain on the display panel 100 and the boundaries of the stain in the 3D image do not match so that the stain may not be completely removed.

The stain detecting apparatus 600 may further generate the second stain compensating value COMP2 to compensate a second stain due to a copy of the input image data KGB to display the 3D image. For example, when at least one of the central coordinate of the stain and the boundary coordinates of the stain is an odd number, the stain detecting apparatus 600 may further generate the second stain compensating value COMP2.

The second stain compensating value COMP2 may have a central compensating value corresponding to the central coordinate of the stain or a coordinate adjacent to the central coordinate of the stain. The second stain compensating value COMP2 may have a boundary compensating value corresponding to the boundary coordinate of the stain or a coordinate adjacent to the boundary coordinate of the stain.

According to the present exemplary embodiment, the luminance profiles of the stains overlapped with each other are divided into independent luminance profiles of the respective stains. The first stain compensating value COMP1 for each stain luminance profile is determined so that the stain on the display panel 100 may be effectively removed. In addition, when the display panel 100 displays the 3D image, the first and second stain compensating values COMP1 and COMP2 are used to compensate the stain so that the stain on the display panel 100 may be effectively removed. Thus, the display quality of the display panel 100 may be improved.

According to the exemplary embodiments of the present invention as explained above, the luminance profiles of the stains overlapped with each other are divided into independent luminance profiles of the respective stains. The stain compensating value for each stain's luminance profile is determined so that the stain on the display panel 100 may be effectively removed. In other words, a stain having a plurality of overlapping luminance profiles is removed. Thus, the display quality of the display panel 100 may be improved.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of compensating a stain on a display panel, the method comprising:
- detecting a luminance distribution of a display panel;
- dividing, using the luminance distribution, luminance profiles of stains overlapped with each other into individual luminance profiles for each of the stains;
- determining an area and a shape of the stain corresponding to one of the individual luminance profiles;
- generating a stain compensating value for the stain corresponding to the individual luminance profile; and
- compensating input image data using the stain compensating value.

2. The method of claim 1, wherein determining an area and a shape of the stain corresponding to one of the individual luminance profiles comprises:
- determining a central coordinate of the stain, wherein the central coordinate has a maximum luminance or a minimum luminance; and
- determining a boundary coordinate of the stain, wherein the boundary coordinate corresponds to a boundary between the stain and a normal luminance area.

3. The method of claim 2, wherein the stain compensating value is generated using the central coordinate of the stain and the boundary coordinate of the stain.

4. The method of claim 3, wherein the stain compensating value is generated by a linear interpolation method.

5. The method of claim 3, wherein the stain compensating value varies according to grayscales of the input image data corresponding to the stain.

6. The method of claim 2, wherein when the display panel displays a three-dimensional ("3D") image, the generating a stain compensating value for the stain comprises:
- generating a first stain compensating value using a half of the central coordinate of the stain and a half of the boundary coordinate of the stain; and
- generating a second stain compensating value to compensate another stain.

7. The method of claim 6, wherein the second stain compensating value is generated when the central coordinate of the stain or the boundary coordinate of the stain is an odd number.

8. The method of claim 6, wherein when the display panel displays the 3D image, the input image data comprises:

left image data having a resolution half of a resolution of the display panel; and right image data having a resolution half of the resolution of the display panel.

9. A method of driving a display panel, the method comprising:

detecting a luminance distribution of a display panel;

dividing, using the luminance distribution, luminance profiles of stains overlapped with each other into individual luminance profiles for each of the stains;

determining an area and a shape of the stain corresponding to one of the individual luminance profiles;

generating a stain compensating value for the stain corresponding to the individual luminance profile;

compensating input image data using the stain compensating value;

generating a data voltage based on the compensated input image data; and outputting the data voltage to the display panel.

10. The method of claim 9, wherein determining an area and a shape of the stain corresponding to one of the individual luminance profiles comprises:

determining a central coordinate of the stain, wherein the stain has a maximum luminance or a minimum luminance; and determining a boundary coordinate of the stain, wherein the boundary coordinate corresponds to a boundary between the stain and a normal luminance area.

11. The method of claim 10, wherein the stain compensating value is generated using the central coordinate of the stain and the boundary coordinate of the stain.

12. The method of claim 11, wherein the stain compensating value is generated by a linear interpolation method.

13. The method of claim 11, wherein the stain compensating value varies according to grayscales of the input image data corresponding to the stain.

14. The method of claim 10, wherein when the display panel displays a three-dimensional ("3D") image, the generating a stain compensating value for the stain comprises:

generating a first stain compensating value using a half of the central coordinate of the stain and a half of the boundary coordinate of the stain; and generating a second stain compensating value to compensate another stain.

15. The method of claim 14, wherein the second stain compensating value is generated when the central coordinate of the stain or the boundary coordinate of the stain is an odd number.

16. The method of claim 14, wherein when the display panel displays the 3D image, the input image data includes:

left image data having a resolution half of a resolution of the display panel; and right image data having a resolution half of the resolution of the display panel.

17. A display apparatus, comprising:

a display panel configured to display an image;

a timing controller configured to compensate input image data using a stain compensating value for a stain corresponding to a luminance profile that is overlapped by a luminance profile of another stain; and a data driver configured to generate a data voltage based on the compensated input image data and configured to output the data voltage to the display panel.

18. The display apparatus of claim 17, wherein the stain compensating value is generated using a central coordinate of the stain, wherein the central coordinate has a maximum luminance or a minimum luminance, and a boundary coordinate of the stain, wherein the boundary coordinate corresponds to a boundary between the stain and a normal luminance area.

19. The display apparatus of claim 18, wherein the timing controller includes a three dimensional ("3D") formatter configured to generate a 3D data signal based on the compensated input image data.

20. The display apparatus of claim 19, wherein when the display panel displays a 3D image, the stain compensating value comprises: a first stain compensating value using a half of the central coordinate of the stain and a half of the boundary coordinate of the stain; and a second stain compensating value to compensate another stain.

21. A method of compensating a stain on a display panel, comprising:

detecting a luminance distribution of the display panel;

distinguishing a first stain luminance profile from a second stain luminance profile using the luminance distribution, wherein the first and second stain luminance profiles overlap each other;

generating a first stain compensating value based on a parameter of the first stain luminance profile and a second stain compensating value based on a parameter of the second stain luminance profile; and removing the stain from the display panel using the first and second stain compensating values.

* * * * *